United States Patent Office 3,781,266
Patented Dec. 25, 1973

3,781,266
WATER-INSOLUBLE PHENYL-AZO-NAPHTHYL-
AMIDO-BENZIMIDAZOLONE DYESTUFFS
Erich Dietz, Kelkheim, Taunus, Joachim Ribka, Offenbach am Main, and Willi Steckelberg, Hofheim, Taunus, Germany, assignors to Farbwerke Hoechst Aktiengesellschaft vormals Meister Lucius & Bruning, Frankfurt am Main, Germany
No Drawing. Filed Aug. 3, 1970, Ser. No. 60,607
Claims priority, application Germany, Aug. 21, 1969, P 19 42 507.1
Int. Cl. C09b 29/20, 29/36; D06p 1/08
U.S. Cl. 260—157
7 Claims

ABSTRACT OF THE DISCLOSURE

Water-insoluble monoazo dyestuffs of the general formula

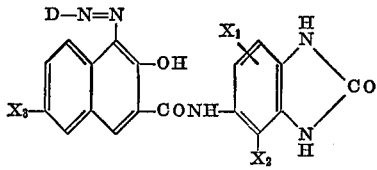

wherein D is a radical of the terephthalic acid mono amide series and $X_1$, $X_2$ and $X_3$ are hydrogen, halogen, alkyl or alkoxy. Said pigments can be used, for instance, for the dyeing, printing or coloring of lakes, lake-formers, solutions or products made of acetyl cellulose, natural or synthetic resins, polystyrene, polyolefins, polyacrylic compounds, polyvinyl compounds, polyesters, rubber, casein or silicone resins, textile fibers, cellulose ethers or esters, polyamides, polyurethanes or paper. These dyestuffs show good fastness properties to light, weather and migration; have a high thermal stability and high tinctorial strength; and are resistant to the influence of solvents, acids and alkalis.

The present invention provides new valuable water-insoluble monoazo dyestuffs of the general formula

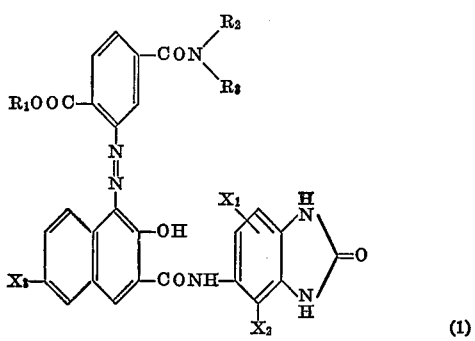

in which $X_1$, $X_2$ and $X_3$ each represents hydrogen, halogen, preferably chlorine or bromine, alkyl, preferably methyl, or alkoxy, preferably methoxy, $R_1$ represents alkyl, preferably having 1 to 6 carbon atoms, cycloalkyl or aralkyl, $R_2$ stands for hydrogen, optionally substituted alkyl or alkenyl, preferably having 1 to 6 carbon atoms, cycloalkyl, aralkyl or aryl which may be substituted by non-water-solubilizing groups, and $R_3$ stands for hydrogen or optionally substituted alkyl or alkenyl, preferably having 1 to 6 carbon atoms, and $R_2$ and $R_3$ may also form a ring together with the nitrogen atom. More particularly, $X_1$, $X_2$ and $X_3$ each is hydrogen, chlorine, bromine, methyl or methoxy, $R_1$ is alkyl of 1 to 6 carbon atoms, cyclohexyl or benzyl, $R_2$ is hydrogen or alkyl or alkenyl of 1 to 6 carbon atoms.

This invention also relates to a process for preparing these dyestuffs by coupling a diazotized amine of the general formula

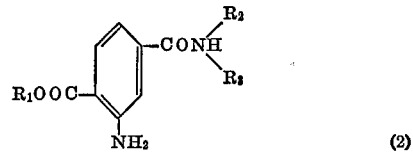

in which $R_1$, $R_2$ and $R_3$ are defined as above, with a coupling component of the general formula

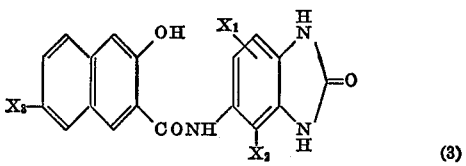

in which $X_1$, $X_2$ and $X_3$ are defined as above.

The amines of the General Formula 2 used as diazo components can be prepared by known methods, for example by partially saponifying a nitro-terephthalic acid diester of the General Formula 4 in which $R_1$ is alkyl, preferably having 1 to 6 carbon atoms, for example methyl, ethyl, n-propyl, i-propyl, n-butyl, i-butyl, s-butyl, t-butyl, n-pentyl or n-hexyl, cycloalkyl, for example cyclohexyl, or aralkyl, for example benzyl, according to the following formula scheme, converting it into the acid chloride, for example in toluene by means of thionyl chloride, condensing the acid chloride with an amine of the General Formula 5, and catalytically hydrogenating the condensation product.

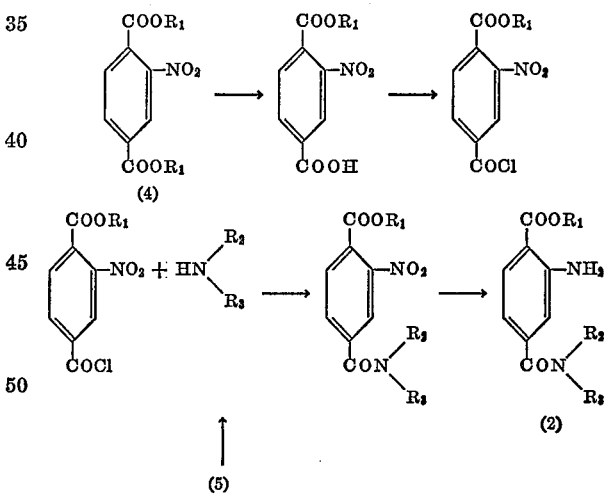

As amines of the General Formula 5 there may, for example, be mentioned:
Ammonia, methylamine, ethylamine, n-propylamine, i-propylamine, n-butylamine, i-butylamine, s-butylamine, t-butylamine, n-pentylamine, s-pentylamine, n-hexylamine, allylamine, dimethylamine, diethylamine, di-n-propylamine, di-n-butylamine, cyclohexylamine, benzylamine, piperidine, aniline, mono-, di- and trihalogeno-anilines, such as 2-chloro-aniline, 3-chloro-aniline, 4-chloro-aniline, 2,4 - dichloro-aniline, 2,5 - dichloro-aniline, 2,6 - dichloro-aniline, 3,4 - dichloro-aniline, 2,4,5 - trichloro-aniline, 2,4,6 - trichloro-aniline, 2 - bromo-aniline, 4 - bromo-aniline, 2,4 - dibromo-aniline, 2,5 - dibromo-aniline, alkyl-anilines such as 2 - methyl-aniline, 3 - methyl-aniline, 4-methyl-aniline, 2,4 - dimethyl-aniline, 2,5 - dimethyl-aniline, 4 - ethyl-aniline, 4 - isopropyl-aniline, alkoxy-anilines such as 2 - methoxy-amine, 4 - methoxy-aniline, 4 - ethoxy-aniline, 2 - butoxy-aniline, 2,4 - dimethoxy-aniline, 2,5 - dimethoxy-aniline, 2,5 - diethoxy-aniline, halogenoalkyl-anilines, such as 2 - methyl - 4 - chloro-aniline, 2 - methyl - 5 - chloro-aniline, 2 - methyl - 3 - chloro-aniline, 2 - chloro - 5 - methyl-aniline, 2,4-dichloro-5 - ethyl-aniline, 2,5 - dichloro - 4 - methyl-aniline, 2,4,6-trichloro - 3 - methyl-aniline, 2 - trifluoromethyl-4-chloro-aniline, 2 - chloro - 5 - trifluoromethyl-aniline, halogeno-alkoxy-anilines, such as 2-methoxy-5-chloro-aniline, 2-ethoxy - 5 - chloro-aniline, 2,4 - dichloro - 5 - methoxy-aniline, 4 - chloro - 2,5 - dimethoxy-aniline, acylamino-anilines, such as 4 - acetamino-aniline, 2 - chloro-4-methyl - 5 - acetamino-aniline, 2 - chloro - 5 - benzoyl-amino-aniline, amines acylated at the nucleus, such as 3-amino - 4 - chloro-aceto-phenone, 3 - amino - 4 - chloro-benzophenone, amino-diphenyl ethers, such as 2 - amino-diphenyl ether, 2 - amino - 2′, 5′ - dichloro-diphenyl ether, aminobenzene carboxylic acid amides and esters, such as anthranilic acid methyl ester, anthranilic acid butyl ester, 4-chloro-anthranilic acid methyl ester, amino-terephthalic acid dimethyl ester, 4 - amino-benzoic acid amide, 3-amino - 4 - chloro-benzoic acid methylamide, 3 - amino-4-methyl-benzoic acid amide, aminobenzene-sulfonic acid amides, such as 4 - amino-benzene-sulfonic acid amide, 2,5 - dimethoxy - 4 - amino-benzene-sulfonic acid methyl amide, 2 - amino-terephthalic acid methyl ester - (1)-amide-(4), naphthyl amine and substituted naphthyl amines, such as 1-amino-2-methoxy-naphthalene.

The coupling components of the general formula 3 may be prepared by known methods, for example by condensation of 2-hydroxy-naphthoic acid-(3) with 5-amino-benzimidazolone. As coupling components there may be mentioned, for example:

5-(2′-hydroxy-3′-naphthoylamino)-benzimidazolone,
5-(6′-bromo-2′-hydroxy-3′-naphthoylamino)-benzimidazolone,
7-chloro-5-(2′-hydroxy-3′-naphthoylamino)-benzimidazolone,
6-chloro-5-(2′-hydroxy-3′-naphthoylamino)-benzimidazolone,
7-bromo-5-(2′-hydroxy-3′-naphthoylamino)-benzimidazolone,
6-bromo-5-(2′-hydroxy-3′-naphthoylamino)-benzimidazolone,
7-methoxy-5-(2′-hydroxy-3′-naphthoylamino)-benzimidazolone,
6-methyl-5-(2′-hydroxy-3′-naphthoylamino)-benzimidazolone,
4-methyl-6-chloro-5-(2′-hydroxy-3′-naphthoylamino)-benzimidazolone and
7-chloro-5-(6′-bromo-2′-hydroxy-3′-naphthoylamino)-benzimidazolone.

The dyestuffs of the General Formula 1 are prepared according to known methods, for example by coupling the diazonium compounds with coupling components in an aqueous medium, advantageously in the presence of a non-ionogenic, anion-active or cation-active dispersing agent or of an organic solvent. In some cases, the diazonium salts are sparingly soluble in an aqueous medium and therefore precipitate. They can be isolated and used for coupling as a moist paste. Diazotization may also be carried out in a suitable organic medium, for example glacial acetic acid, alcohol, dioxan, tetrahydrofuran, formamide, dimethylformamide or dimethylsulfoxide. The solution of the diazonium compound thus obtained is then coupled with the coupling component.

The dyestuffs can be prepared in substance or on a substrate, for example heavy spar.

In many cases, the dyestuffs thus obtained have a hard grain and have to be after-treated to develop their full tinctorial strength and an especially favorable crystal structure. For this purpose, the dried and ground or moist dyestuffs are, for example, refluxed for some time in pyridine, dimethylformamide or other organic solvents, such as dimethylsulfoxide, alcohol, chlorobenzene, di-chlorobenzene, glacial acetic acid, quinoline, glycol or nitrobenzene, or heated to elevated temperatures under pressure. In some cases, the hard grain can also be converted into a soft grain by heating with water under pressure, where required, with an addition of dispersing agents and organic solvents, for example those of the aforementioned type.

The new dyestuffs are water-insoluble pigments which are suitable for the production of color lakes, lake-formers, solutions and products made of acetyl cellulose, natural or synthetic resins, such as polymerization or condensation resins, as for example amino- or pheno-plasts, as well as products made of polystyrene; poly-olefins, as for example polyethylene or polypropylene; polyacryl compounds, polyvinyl compounds, for example polyvinyl chloride or polyvinyl acetate; polyesters, rubber, casein resins or silicone resins.

The new pigment dyestuffs are furthermore suitable for the pigment printing on substrates, especially textile fibrous materials or other plane structures, for example paper.

The dyestuffs may also be used for other purposes, for example in a finely divided form for the dyeing of rayon made of viscose or cellulose ethers or esters, polyamides, polyurethanes, polyglycol terephthalates or polyacrylonitrile in the spinning solution or for the coloring of paper.

Owing to their favorable rheological properties, the dyestuffs can be well processed in the cited media. They show good fastness properties to light, weather and migration, have a high thermal stability and high tinctorial strength and, in many cases, they exhibit pure, brilliant shades. They are resistant to the influence of chemicals, especially to solvents, acids and alkalis. Among the dyestuffs of the invention corresponding to the General Formula 1, especially dyestuffs of the General Formula 1a

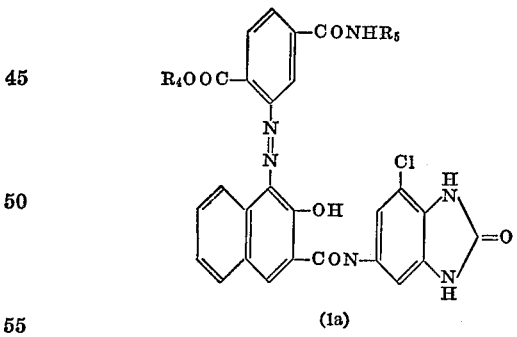

(1a)

in which $R_4$ stands for alkyl having 1 to 6 carbon atoms and $R_5$ for hydrogen, optionally substituted alkyl or alkenyl, aralkyl or aryl which may be substituted by non-water-solubilizing groups, are distinguished by excellent properties and often very pure and brilliant shades.

The following examples serve to illustrate the invention, the parts and percentages being by weight unless stated otherwise.

EXAMPLE 1

9.7 parts of 2-amino-terephthalic acid methyl ester-(1)-amide-(4) were stirred overnight with 16.6 parts by volume of 37% hydrochloric acid and 24 parts by volume of water. The mixture was diluted with 100 parts by volume of water and diazotized at 5–10° C. with 10.2 parts by volume of 5 N sodium nitrite solution. The solution was clarified and the nitrite excess was destroyed by means of amidosulfonic acid. 100 parts by volume of 4 N sodium acetate solution, 50 parts by volume of glacial acetic acid and 5 parts by volume of a 10% aqueous solution of a reaction product of 1 mol of oleyl alcohol and 25 mols of ethylene oxide were introduced into the coupling vessel. The diazonium salt solution was added thereto and at 5–10° C. a solution of 18.5 parts of 7-chloro - 5-(2′-hydroxy-3′-naphthoylamino)-benzimidazolone in 200 parts by volume of water and 80 parts by volume of 2 N sodium hydroxide solution was added slowly. When coupling was complete, the solution was heated to 95° C. by passing in steam, the dyestuff was suction-filtered and washed with water. The moist press cake was then heated at 150° C. for 6 hours in a closed vessel with 500 parts of 50% aqueous ethyl alcohol. The product was suction-filtered while hot and washed with hot water. The dyestuff was dried and ground. The pigment dyestuff having the formula

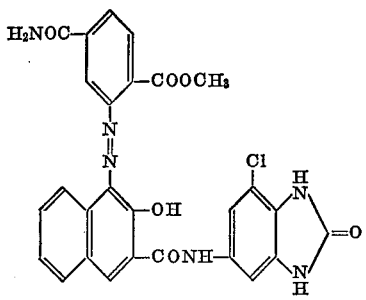

when incorporated into polyvinyl chloride, a lacquer, a printing ink or a spinning-solution yielded pure yellowish red colorations having a very good fastness to heat, solvents and light.

When 67 parts of polyvinyl chloride, 33 parts of a plasticizer mixture (mixture of equal parts of dioctyl phthalate and dibutyl phthalate), 0.1 part of the dyestuff and 0.5 part of titanium dioxide were mixed for 15 minutes at 150° C. on a roller device and the mixture was processed into a thin film, the coloration of this film was distinguished by a yellowish red shade very fast to heat, migration and light as well as by a high color intensity and a very pure shade.

EXAMPLE 2

15.3 parts of 2-amino-terephthalic acid methyl ester-(1)-di-n-butyl-amide-(4) were stirred in 40 parts by volume of 5 N hydrochloric acid, the mixture was diluted with 120 parts by volume of ice water and diazotized at 5–10° C. with 10 parts by volume of 5 N sodium nitrite solution. Subsequently, the solution was clarified and the nitrite excess was destroyed by means of amido-sulfonic acid.

The diazonium salt solution was added to a buffer solution consisting of 200 parts by volume of 2 N sodium hydroxide solution and 23 parts by volume of glacial acetic acid and the whole was cooled to 0–5° C.

A solution of 16.5 parts of 5-(2′-hydroxy-3′-naphthoyl-amino)-benzimidazolone in 80 parts by volume of 2 N sodium hydroxide solution, 200 parts by volume of water and 5 parts by volume of a 10% solution of a reaction product of 1 mol of stearyl alcohol and 20 mols of ethylene oxide was slowly added to this mixture. When coupling was complete, the mixture was heated to 95° C. by passing in direct steam, the product was suction-filtered and washed with water. The moist press cake was heated at 90° C. for 2 hours with 200 parts of dimethylformamide, the dyestuff was suction-filtered, washed with water and dried.

The dyestuff of the formula

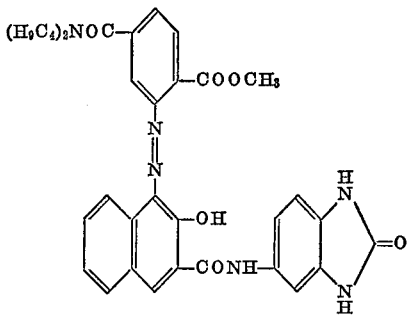

when incorporated into polyvinyl chloride, a lacquer, a printing ink or a spinning-solution yielded pure yellowish red colorations fast to heat, solvents and light.

EXAMPLE 3

17.0 parts of 2-amino-terephthalic acid methyl ester-(1)-(2′,5′-dichloro-anilide)-(4) were stirred with 80 parts by volume of glacial acetic acid and 12.5 parts by volume of concentrated hydrochloric acid were added. At about 15° C., the mixture was diazotized with 10.2 parts by volume of 5 N sodium nitrite solution. The solution was diluted with 200 parts by volume of water, clarified and excess nitrite was destroyed by means of amidosulfonic acid.

18.5 parts of 7-chloro-5-(2′-hydroxy - 3′ - naphthoyl-amino)-benzimidazolone were dissolved in 150 parts by volume of 2 N sodium hydroxide solution and 100 parts by volume of water, and then 5 parts by volume of a 10% aqueous solution of a reaction product of 1 mol of oleyl alcohol and 30 mols of ethylene oxide were added. A mixture of 200 parts by volume of 2 N sodium hydroxide solution and 23 parts by volume of glacial acetic acid as well as 5 parts by volume of a 10% aqueous solution of a reaction product of 1 mol of oleyl alcohol and 30 mols of ethylene oxide was introduced into the coupling vessel. At the same time, solutions of the diazonium salt and of the coupling component were added within 3 hours to this buffer solution, the pH being maintained at 5 to 6 by adding 2 N sodium hydroxide solution. When coupling was complete, the mixture was heated to 95° C. within 1 hour by means of steam, the product was suction-filtered, washed with water and dried. The dried and ground dyestuff was stirred with 400 parts of dimethylformamide and the mixture was heated to 100–120° C. for 2 hours. The dyestuff was suction-filtered, washed with hot water, dried and ground. It has a soft grain and a high tinctorial strength.

Upon incorporation into polyvinyl chloride, a lacquer, a printing ink or a spinning-solution, this dyestuff of the formula

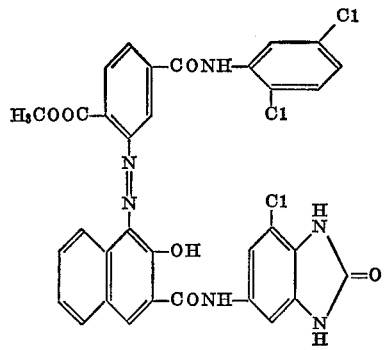

yields very pure yellowish red colorations very resistant to heat and very fast to solvents and light. When 0.8 part of this pigment, 2.4 parts of aluminum hydroxide and 4.8 parts of a book-printing varnish were mixed on a three-roller loom and triturated, a book-printing ink was obtained having a pigment content of 10% and yielding yellowish red prints of high color intensity and purity, which were very fast to light.

EXAMPLE 4

16 parts of 2-amino-terephthalic acid methyl ester-(1)-(2' - chloro-4'-methyl-anilide)-(4) were stirred with 30 parts by volume of glacial acetic acid and the mixture was dissolved by adding 120 parts by volume of dimethylformamide. 30 parts of volume of 5 N hydrochloric acid were added and the mixture was diazotized with 10.1 parts by volume of a 5 N sodium nitrite solution. Excess nitrite was destroyed by means of amidosulfonic acid.

21 parts of 5-(6'-bromo-2'-hydroxy-3'-napthoylamino)-benzimidazolone were dissolved by heating with 600 parts by volume of dimethylformamide and a solution of 60 parts of sodium acetate in 150 parts by volume of water. At a temperature of 10° C., the diazonium salt suspension was added to the suspension of the coupling component. When coupling was complete the mixture was heated to 95° C. by means of steam, the product was suction-filtered and the moist press cake was treated at 120° C. for 11 hours with 400 parts by volume of dimethylformamide. The dyestuff was suction-filtered, washed with hot water and dried.

Upon incorporation into polyvinyl chloride, a lacquer, a printing ink or a spinning-solution, the dyestuff of the formula

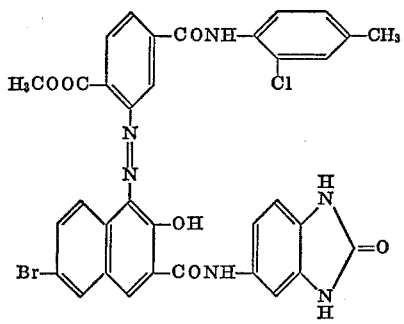

yielded pure bluish red colorations very resistant to heat and solvents and very fast to light.

EXAMPLE 5

17.7 parts of 2-amino-terephthalic acid ethyl ester-(1)-(2',5'-dichloro-anilide)-(4) were diazotized as disclosed in Example 3 and coupled with 18.5 parts of 7-chloro-5-(2'-hydroxy-3'-naphthoylamino)-benzimidazolone as disclosed in Example 3. To convert its hard grain into a soft grain having a high tinctorial strength, the dry dyestuff was stirred with 400 parts by volume of glacial acetic acid and heated for 5 hours at 100–110° C. The dyestuff was suction-filtered, washed with methanol and then with water, dried and ground.

Upon incorporation into polyvinyl chloride, a lacquer, a printing ink or a spinning-solution, the dyestuff of the formula

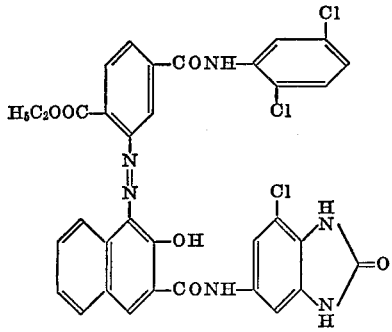

yielded very pure red colorations very resistant to heat and very fast to solvents and light.

EXAMPLE 6

13.5 parts of 2-amino-terephthalic acid methylester-(1)-anilide-(4) were stirred overnight with 40 parts by volume of 5 N hydrochloric acid, the mixture was diluted with 100 parts by volume of ice water and at 5–10° C. diazotized with 10.1 parts by volume of 5 N sodium nitrite solution. The solution was then clarified and the excess nitrite was destroyed by means of amidosulfonic acid.

16.5 parts of 5-(2'-hydroxy-3'-naphthoylamino)-benzimdazolone were dissolved in 80 parts by volume of 2 N sodium hydroxide solution and 300 parts by volume of water.

A buffer solution was introduced into the coupling vessel consisting of 225 parts by volume of 2 N sodium hydroxide solution, 60 parts by volume of 80% phosphoric acid and 5 parts by volume of a 10% aqueous solution of a reaction product of 1 mol of oleyl alcohol and 30 mols of ethylene oxide. The solutions of the diazonium salt and the coupling component were simultaneously added within 2 hours to this buffer solution, while a temperature of from 5–10° C. was maintained. When coupling was complete, the mixture was heated to 95° C. by means of steam, the product was suction-filtered and washed with hot water. The moist press cake was dried and powdered. To convert its hard grain into a soft one the dyestuff was treated for 3 hours at 110° C. with 500 parts by volume of dimethylformamide.

Upon incorporation into polyvinyl chloride, a lacquer, a printing ink or a spinning-solution, the dyestuff of the formula

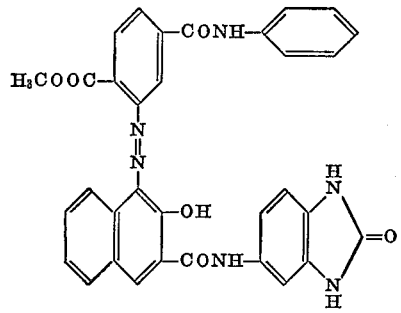

yielded pure yellowish red coloration very resistant to heat and very fast to solvents and light.

EXAMPLE 7

16.0 parts of 2-amino-terephthalic acid methyl ester-(1)-(5'-chloro-2'-methyl-anilide)-(4) were diazotized as disclosed in Example 3 and coupled with 18.5 parts of 7 - chloro-5-(2'-hydroxy-3'-naphthoylamino)-benzimidazolone. To convert its hard grain into a soft one, the dry powdered dyestuff was stirred with 500 parts by volume of dimethylformamide and heated at 100° C. for 3 hours.

Upon incorporation into polyvinyl chloride, a lacquer, a printing ink or a spinning-solution, the dyestuff of the formula

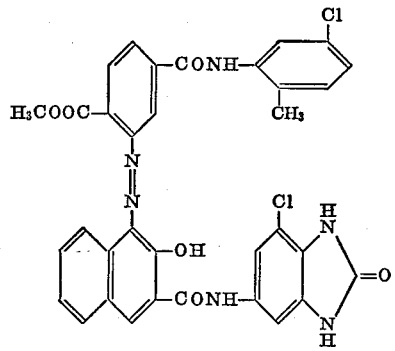

yielded very pure yellowish red colorations very resistant to heat and very fast to solvents and to light.

EXAMPLE 8

16.4 parts of 2-amino-terephthalic acid methyl ester-(1)-(2'-carbomethoxy-anilide)-(4) were diazotized as disclosed in Example 4, coupled with 16.5 parts of 5-(2'-hydroxy-3'-naphthoylamino)-benzimidazolone. The dyestuff was suction-filtered, washed and dried. The dry dyestuff was stirred with 400 parts by volume of dimethylformamide and heated for 2 hours at 80–90° C. In this manner a brown dyestuff of the formula

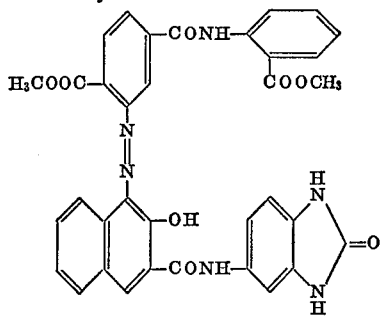

was obtained which, upon incorporation into polyvinyl chloride, a lacquer, a printing ink or a spinning-solution, yielded brown colorations resistant to heat and fast to solvents and to light.

EXAMPLE 9

Coupling was effected as disclosed in Example 8. The dry dyestuff was stirred with 400 parts by volume of glacial acetic acid and treated at 110° C. for 3 hours.

In this manner a red dyestuff of the formula

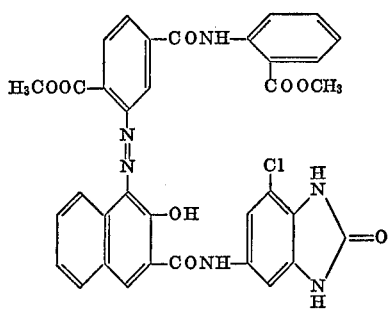

was obtained which, upon incorporation into polyvinyl chloride, a lacquer, a printing ink or a spinning solution, yielded yellowish red colorations resistant to heat and fast to solvents and to light.

The following table comprises a number of further components to be used according ot the invention as well as the shades of graphic prints of the dyestuffs prepared therefrom in substance.

TABLE

| Diazo component | Coupling component | Shade |
|---|---|---|
| 2-amino-terephthalic acid methyl ester-(1)-amide-(4). | 5-(2'-hydroxy-3'-naphthoylamino)-benzimidazolone. | Yellowish red. |
| 2-amino-terephthalic acid ethyl ester-(1)-amide-(4). | do | Do. |
| 2-amino-terephthalic acid n-hexyl ester-(1)-amide-(4). | do | Do. |
| 2-amino-terephthalic acid cyclohexyl ester-(1)-amide-(4). | do | Do. |
| 2-amino-terephthalic acid benzyl ester-(1)-amide-(4). | do | Do. |
| 2-amino-terephthalic acid methyl ester-(1)-methyl-amide-(4). | do | Do. |
| 2-amino-terephthalic acid n-propyl ester-(1)-methyl-amide-(4). | do | Do. |
| 2-amino-terephthalic acid methyl ester-(1)-allylamide-(4). | do | Do. |
| 2-amino-terephthalic acid methyl ester-(1)-cyclohexyl-amide-(4). | do | Do. |
| 2-amino-terephthalic acid methyl ester-(1)-benzyl-amide-(4). | do | Do. |
| 2-amino-terephthalic acid methyl ester-(1)-dimethyl amide-(4). | do | Bluish red. |
| 2-amino-terephthalic acid ethyl ester-(1)-anilide-(4). | do | Red. |
| 2-amino-terephthalic acid methyl ester-(1)-(2'-chloro-anilide)-(4). | do | Red. |
| 2-amino-terephthalic acid methyl ester-(1)-(2'-bromo-anilide)-(4). | do | Red. |
| 2-amino-terephthalic acid ethyl ester-(1)-(2,5'-dichloro-anilide)-(4). | do | Brown. |
| 2-amino-terephthalic acid methyl ester-(1)-(2'-methyl-anilide)-(4). | do | Yellowish red. |
| 2-amino-terephthalic acid methyl ester-(1)-(4'-isopropyl-anilide)-(4). | do | Do. |
| 2-amino-terephthalic acid methyl ester-(1)-(4'-methoxy-anilide)-(4). | do | Do. |
| 2-amino-terephthalic acid n-propyl ester-(1)-(2'-methyl-5'-chloro-anilide)-(4). | do | Red. |
| 2-amino-terephthalic acid methyl ester-(1)-(2'-methoxy-5'-chloro-anilide)-(4). | do | Red. |
| 2-amino-terephthalic acid methyl ester-(1)-(2'-chloro-5'-trifluoromethyl-anilide)-(4). | do | Red. |
| 2-amino-terephthalic acid methyl ester-(1)-(2'-chloro-5'-benzoylamino-anilide)-(4). | do | Red. |
| 2-amino-terephthalic acid methyl ester-(1)-(2'-phenoxy-anilide)-(4). | do | Red. |
| 2-amino-terephthalic acid n-propyl ester-(1)-(4'-sulfon-amido-anilide)-(4). | do | Red. |
| 2-amino-terephthalic acid methyl ester-(1)-(2'-chloro-5'-carbonamido-anilide)-(4). | do | Red. |
| 2-amino-terephthalic acid ethyl ester-(1)-amide (4). | 7-chloro-5-(2'-hydroxy-3'-naphthoylamino)-benzimidazolone. | Yellowish red. |
| 2-amino-terephthalic acid n-propyl ester-(1)-amide-(4). | do | Do. |
| 2-amino-terephthalic acid i-butyl ester-(1)-amide-(4). | do | Do. |
| 2-amino-terephthalic acid n-pentyl ester-(1)-amide-(4). | do | Do. |
| 2-amino-terphthalic acid methyl ester-(1)-allylamide-(4). | do | Do. |
| 2-amino-terephthalic acid methyl ester-(1)-methyl-amide-(4). | do | Do. |
| 2-amino-terephthalic acid methyl ester-(1)-n-butyl-amide-(4). | do | Do. |
| 2-amino-terephthalic acid methyl ester-(1)-cyclohexyl-amide-(4). | do | Do. |
| 2-amino-terphthalic acid methyl ester-(1)-benzyl amide-(4). | do | Do. |
| 2-amino-terephthalic acid ethyl-ester-(1)-n-propyl amide-(4). | do | Do. |
| 2-amino-terephthalic acid methyl ester-(1)-diethyl amide-(4). | do | Do. |
| 2-amino-terephthalic acid methyl ester-(1)-di-n-butylamide-(4). | do | Do. |
| 2-amino-terephthalic acid ethyl ester-(1)-anilide-(4). | do | Do. |
| 2-amino-terephthalic acid methyl ester-(1)-(2'-chloro-anilide)-(4). | do | Bluish red. |
| 2-amino-terephthalic acid ethyl ester-(1)-(2'-bromo-anilide)-(4). | do | Do. |
| 2-amino-terephthalic acid methyl ester-(1)-(2'-methyl-anilide)-(4). | do | Do. |
| 2-amino-terephthalic acid methyl ester-(1)-(2'-methoxy-anilide)-(4). | do | Do. |
| 2-amino-terephthalic acid methyl ester-(1)-(2'-chloro-4'-methyl-anilide)-(4). | do | Red. |
| 2-amino-terephthalic acid methyl ester-(1)-(2'-trifluoro-methyl-4'-chloroanilide)-(4). | do | Red. |
| 2-amino-terephthalic acid methyl ester-(1)-(2'-methoxy-5'-chloro-anilide)-(4). | do | Red. |
| 2-amino-terephthalic acid methyl ester-(1)-(4'-aceto-amino-anilide)-(4). | do | Red. |
| 2-amino-terephthalic acid methyl ester-(1)-(2'-chloro-5'-acetyl-anilide)-(4). | do | Red. |
| 2-amino-terephthalic acid methyl ester-(1)-(2'-carbo-methoxy-anilide)-(4). | do | Yellowish red. |

TABLE—Continued

| Diazo component | Coupling component | Shade |
|---|---|---|
| 2-amino-terephthalic acid methyl ester-(1)-(2'-phenoxy-anilide)-(4). | ..…do..… | Red. |
| 2-amino-terephthalic acid methyl ester-(1)-(2'-chloro-5'-carbonamido-anilide)-(4). | ..…do..… | Red. |
| 2-amino-terephthalic acid methyl ester-(1)-(2',4',5'-trichloro-anilide)-(4). | ..…do..… | Bluish Red. |
| 2-amino-terephthalic acid methyl ester-(1)-amide-(4). | 6-chloro-5-(2'-hydroxy-3'-naphtholamino)-benzimidazolone. | Yellowish red. |
| 2-amino-terephthalic acid n-butyl ester-(1)-amide-(4). | ..…do..… | Do. |
| 2-amino-terephthalic acid ethyl ester-(1)-ethylamide(-4). | ..…do..… | Do. |
| 2-amino-terephthalic acid methyl ester-(1)-cyclohexyl-amide-(4). | ..…do..… | Do. |
| 2-amino-terephthalic acid methyl ester-(1)-di-n-propylamide-(4). | ..…do..… | Red. |
| 2-amino-terephthalic acid methyl ester-(1)-anilide-(4). | ..…do..… | Red. |
| 2-amino-terephthalic acid methyl ester-(1)-(2'-chloro-4'-methyl-anilide)-(4). | ..…do..… | Yellowish red. |
| 2-amino-terephthalic acid methyl ester-(1)-amide-(4). | 7-bromo-5-(2'-hydroxy-3'-naphthoylamino)-benzimidazolone. | Do. |
| 2-amino-terephthalic acid ethyl ester-(1)-(2',5'-dichloro-anilide)-(4). | ..…do..… | Do. |
| 2-amino-terephthalic acid n-propyl ester-(1)-amide-(4). | 6-methyl-5-(2'-hydroxy-3'-naphthoylamino)-benzimidazolone. | Red. |
| 2-amino-terephthalic acid methyl ester-(1)-(2'-chloro-5'-trifluoromethyl-anilide)-(4). | ..…do..… | Bluish red. |
| 2-amino-terephthalic acid methyl ester-(1)-amide-(4). | 7-methoxy-5-(2'-hydroxy-3'-naphthoylamino)-benzimidazolone. | Maroon. |
| 2-amino-terephthalic acid methyl ester-(1)-(2',5'-dichloro-anilide)-(4). | ..…do..… | Bluish red. |
| 2-amino-terephthalic acid methyl ester-(1)-amide-(4). | 5-(6'-bromo-2'-hydroxy-3'-naphthoylamino)-benzimidazolone. | Do. |
| 2-amino-terephthalic acid methyl ester-(1)-(2'-chloro-4'-methyl-anilide)-(4). | ..…do..… | Do. |
| 2-amino-terephthalic acid methyl ester-(1)-(2',5'-dichloro-anilide)-(4). | 7-chloro-(6'-bromo-2'-hydroxy-3'-naphthoyl-amino)-benzimidazolone. | Do. |
| 2-amino-terephthalic acid methyl ester-(1)-(2'-carbomethoxy-anilide)-(4). | ..…do..… | Red. |

We claim:
1. The dyestuff of the formula

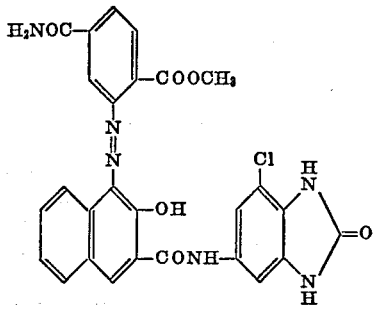

2. The dyestuff of the formula

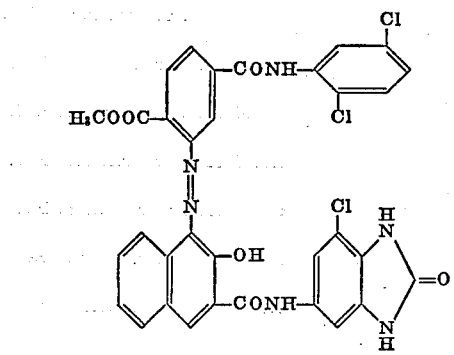

3. The dyestuff of the formula

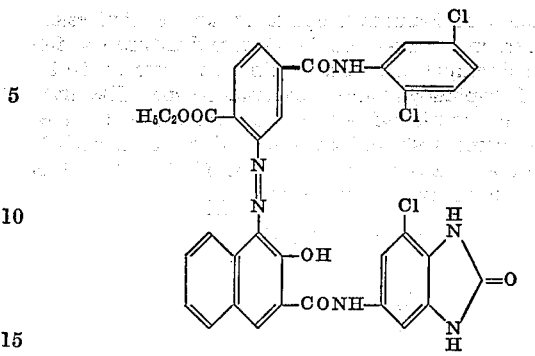

4. The dyestuff of the formula

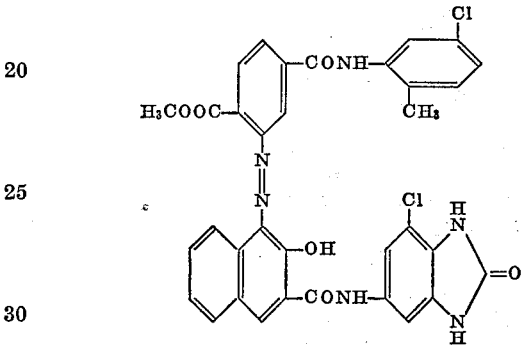

5. The dyestuff of the formula

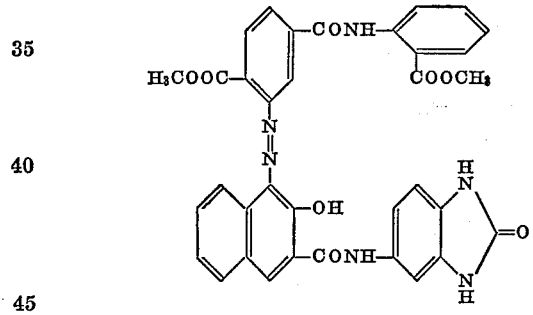

6. The dyestuff of the formula

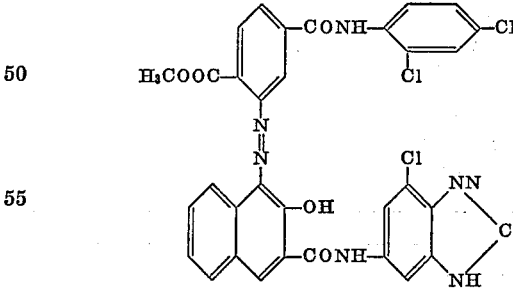

7. The dyestuff of the formula

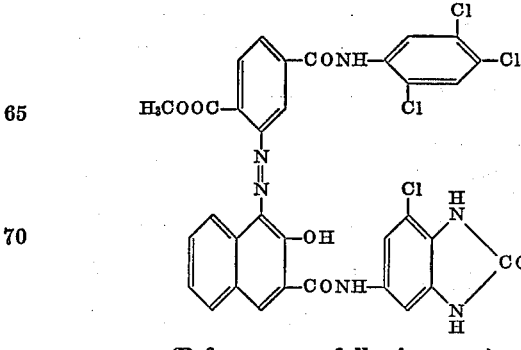

(References on following page)

References Cited

UNITED STATES PATENTS

| | | | |
|---|---|---|---|
| 3,109,842 | 11/1963 | Schilling et al. | 260—157 |
| 3,113,938 | 12/1963 | Nakaten et al. | 260—204 |
| 3,124,565 | 3/1964 | Schilling et al. | 260—157 |
| 3,137,686 | 6/1964 | Dietz et al. | 260—157 |
| 3,321,458 | 5/1967 | Löhe et al. | 260—203 |
| 3,328,384 | 6/1967 | Dietz et al. | 260—157 |
| 3,555,002 | 1/1971 | Ribka et al. | 260—157 |
| 3,555,003 | 1/1971 | Ribka | 260—157 |

FLOYD D. HIGEL, Primary Examiner

U.S. Cl. X.R.

106—288 Q; 117—138.8 B, 138.8 D, 138.8 E, 138.8 F, 143, 154; 260—37 R, 37 N, 37 P, 39 P, 40 R, 41 C, 208, 309.2, 469, 471 R, 475 R

UNITED STATES PATENT OFFICE
CERTIFICATE OF CORRECTION

Patent No. 3,781,266             Dated December 25, 1973

Inventor(s) Dietz et al.

It is certified that error appears in the above-identified patent and that said Letters Patent are hereby corrected as shown below:

IN THE CLAIMS:

Correct the formula of claim 6 to read as follows:

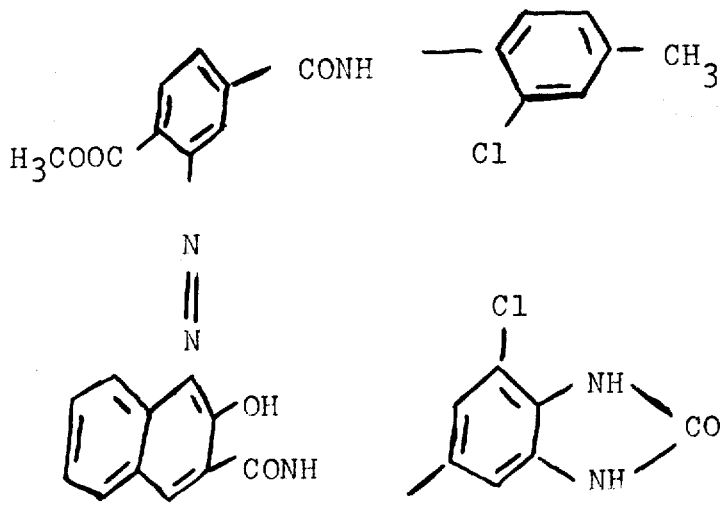

Signed and sealed this 9th day of July 1974.

(SEAL)
Attest:

McCOY M. GIBSON, JR.           C. MARSHALL DANN
Attesting Officer              Commissioner of Patents